US007031251B2

(12) United States Patent
Chen et al.

(10) Patent No.: US 7,031,251 B2
(45) Date of Patent: Apr. 18, 2006

(54) CLIPPING DISTORTION CANCELLER FOR OFDM SIGNALS

(76) Inventors: Hangjun Chen, 78 Heckel St., Belleville, NJ (US) 07109; Alexander M. Haimovich, 6 Hidden Lake Dr., North Brunswick, NJ (US) 08902

( * ) Notice: Subject to any disclaimer, the term of this patent is extended or adjusted under 35 U.S.C. 154(b) by 0 days.

(21) Appl. No.: 10/771,249

(22) Filed: Feb. 3, 2004

(65) Prior Publication Data

US 2004/0165524 A1    Aug. 26, 2004

Related U.S. Application Data

(60) Provisional application No. 60/446,708, filed on Feb. 12, 2003.

(51) Int. Cl.
*H04J 11/00* (2006.01)
(52) U.S. Cl. .................... 370/208; 370/286
(58) Field of Classification Search .......... 370/202, 370/204, 206, 210, 317, 328, 332, 333; 375/148, 375/254, 261, 298, 346
See application file for complete search history.

(56) References Cited

U.S. PATENT DOCUMENTS

| | | | | |
|---|---|---|---|---|
| 6,175,551 B1* | 1/2001 | Awater et al. | ............... | 370/210 |
| 6,314,146 B1* | 11/2001 | Tellado et al. | ............... | 375/346 |
| 6,445,747 B1* | 9/2002 | Jafarkhani et al. | ........... | 370/205 |
| 6,512,797 B1* | 1/2003 | Tellado et al. | ............... | 370/319 |
| 6,522,626 B1* | 2/2003 | Greenwood | ................. | 370/208 |
| 6,781,951 B1* | 8/2004 | Fifield | ......................... | 370/203 |
| 2002/0168016 A1* | 11/2002 | Wang et al. | ................ | 375/260 |
| 2004/0076247 A1* | 4/2004 | Barak et al. | ................ | 375/350 |
| 2004/0086054 A1* | 5/2004 | Corral | ........................ | 375/260 |

OTHER PUBLICATIONS

J. Davis and J. Jedwab, "Peak-to-mean power control in OFDM, Golay Complementary Sequences, and Reed-Muller Codes," IEEE Transactions on Information Theory, vol. 45, pp. 2397-2417 (Nov. 1999).

A. D. S. Jayalath and C. Tellambura, "Reducing the Peak-to-Average Power Ratio of an OFDM Signal Through Bit or Symbol Interleaving," IEEE Electronics Letters, vol. 36, pp. 1161-1163 (Jun. 2000).

(Continued)

*Primary Examiner*—Chi Pham
*Assistant Examiner*—Anh-Vu Ly
(74) *Attorney, Agent, or Firm*—Berkeley Law & Technology Group, LLC

(57) ABSTRACT

Methods and apparatus are provided for reducing clipping noise from an OFDM signal, the methods and apparatus are operable to carry out actions including: (a) transforming a received orthogonal frequency division multiplexed (OFDM) signal from a transmission channel into the frequency domain, the OFDM signal having been subject to a clipping function prior to transmission in order to reduce the peak-to-average power ratio (PAPR); (b) recovering data symbols from the transformed OFDM signal, which include clipping noise; (c) estimating the clipping noise in the frequency domain based on the data symbols; and (d) subtracting the estimated clipping noise from the transformed OFDM signal.

28 Claims, 8 Drawing Sheets

OTHER PUBLICATIONS

X. Li and L. J. Cimini, "Effects of Clipping and Filtering on the Performance of OFDM," in Proc. IEEE Vehicular Technology Conf. (VTC), pp. 1634-1638 (May 1997).

D. Kim and G. L. Stuber, "Clipping Noise Mitigation for OFDM by Decision-aided Reconstruction," IEEE Communications Letters, vol. 3, pp. 4-6 (Jan. 1999).

H. Saeedi, M. Sharif, and F. Marvasti, "Clipping Noise Cancellation in OFDM Systems Using Oversampled Signal Reconstruction," IEEE Communications Letters, vol. 6, pp. 73-75 (Feb. 2002).

H. Ochiai and H. Imai, "Performance Analysis of Deliberately Clipped OFDM Signals," IEEE Transactions on Communications, vol. 50, No. 1, (Jan. 2002).

* cited by examiner

CLIPPING DISTORTION CANCELLER FOR OFDM SIGNALS

CROSS REFERENCE TO RELATED APPLICATIONS

This application claims the benefit of U.S. Provisional Patent Application No. 60/446,708, entitled CLIPPING DISTORTION CANCELLER FOR OFDM SIGNALS, filed Feb. 12, 2003, the entire disclosure of which is hereby incorporated by reference.

BACKGROUND

Orthogonal frequency division multiplexing (OFDM) is one of the technologies considered for 4G broadband wireless communications due to its robustness against multipath fading and relatively simple implementation compared to single carrier systems. To preserve both amplitude and phase information, OFDM transmitters utilize linear power amplifiers. One of the main drawbacks of using OFDM is the high cost of linear power amplifiers with high dynamic range. Such amplifiers are used because the OFDM signals have a high peak-to-average power ratio (PAPR), particularly since the OFDM signal will usually consists of a large number of subcarriers.

Various techniques have been proposed to reduce the PAPR of OFDM signals. For example the following publications describe some of these techniques: J. Davis and J. Jedwab, "Peak-to-mean power control in OFDM, Golay Complementary Sequences, and Reed-Muller Codes," IEEE Transactions on Information Theory, Vol. 45, pp. 2397–2417 (November 1999); A. D. S. Jayalath and C. Tellambura, "Reducing the Peak-to-Average Power Ratio of an OFDM Signal Through Bit or Symbol Interleaving," IEEE Electronics Letters, Vol. 36, pp. 1161–1163 (June 2000); and H. Ochiai and H. Imai, "Performance Analysis of Deliberately Clipped OFDM Signals," IEEE Transactions on Communications, Vol. 50, pp. 89–101 (January 2002), the entire disclosures of each of these publications are incorporated herein by reference.

With respect to the latter approach, the deliberate clipping of the OFDM signal before amplification is a simple and efficient way of controlling the PAPR. The clipping process is characterized by the clipping ratio (CR), defined as the ratio between the clipping threshold and the RMS level of the OFDM signal. Clipping is a non-linear process, which may lead to significant distortion and performance loss. In particular, clipping at the Nyquist sampling rate will cause all the clipping noise to fall in-band and suffers considerable peak re-growth after digital to analog (D/A) conversion.

In the H. Ochiai and H. Imai paper and in X. Li and L. J. Cimini, "Effects of Clipping and Filtering on the Performance of OFDM," in Proc. IEEE Vehicular Technology Conf. (VTC), pp. 1634–1638 (May 1997) (the entire disclosure of which is hereby incorporated by reference), it was shown that clipping an over-sampled OFDM signal reduces the peak re-growth after D/A conversion and generates less in-band distortion. But this technique causes out-of-band noise that needs to be filtered.

The problem of distortion caused by intentional clipping and the attendant out-of-band noise is a significant issue in connection with using OFDM, particularly since clipping noise is the significant factor limiting performance in OFDM systems operating at high signal to noise ratio (SNR).

Although techniques have been proposed for mitigating the effect of clipping noise, they are less than satisfactory. The following publication illustrate this point: D. Kim and G. L. Stuber, "Clipping Noise Mitigation for OFDM by Decision-aided Reconstruction," IEEE Communications Letters, Vol. 3, pp. 4–6 (January 1999); and H. Saedi, M. Sharif, and F. Marvasti, "Clipping Noise Cancellation in OFDM Systems Using Oversampled Signal Reconstruction," IEEE Communications Letters, Vol. 6, pp. 73–75 (February 2002). In both cases, however, acceptable loss in SNR (e.g., about less than 1 dB) is achieved only for $CR \geq 4$ dB. Furthermore, the decision aided reconstruction approach described in the D. Kim and G. L. Stuber publication only applies to Nyquist rate clipping. Finally, the use of oversampled signal reconstruction disclosed in the H. Saedi, M. Sharif, and F. Marvasti publication also requires significant bandwidth expansion to work well.

A fundamental characteristic of these approaches, as well as other proposed methods, is that they attempt to reconstruct the affected (or lost) time domain signal samples resulting from clipping. It is believed that the reconstruction of time domain signals is inherently error prone and, thus, undesirable.

Accordingly, there are needs in the art for new methods and apparatus for processing OFDM signals in order to at least one of reduce PAPR, reduce distortion and out of band radiation.

SUMMARY OF THE INVENTION

While the present invention is not limited by any theory of operation, various aspects of the present invention exploit the fact that, unlike all white Gaussian noise (AWGN), clipping noise is generated by a known process, which can be recreated at the receiver and subsequently removed. Based on this observation and the analysis of the clipping process, a novel iterative clipping noise cancellation is achievable for clipped and filtered OFDM signals in accordance with one or more aspects of the present invention.

The various aspects of the clipping noise cancellation approach discussed and claimed herein are applicable to any of the deliberate clipping approaches and any of the repeated clipping approaches (which is an extension of deliberate clipping).

In accordance with one or more aspects of the present invention, a method includes: (a) transforming a received orthogonal frequency division multiplexed (OFDM) signal from a transmission channel into the frequency domain, the OFDM signal having been subject to a clipping function prior to transmission in order to reduce the peak-to-average power ratio (PAPR); (b) recovering data symbols from the transformed OFDM signal, which include clipping noise; (c) estimating the clipping noise in the frequency domain based on the data symbols; and (d) subtracting the estimated clipping noise from the transformed OFDM signal.

In accordance with one or more further aspects of the present invention, an apparatus includes: a receiver operable to receive an orthogonal frequency division multiplexed (OFDM) signal from a transmission channel, the OFDM signal having been subject to a clipping function prior to transmission in order to reduce the peak-to-average power ratio (PAPR); a frequency transform unit operable to transform the OFDM signal to the frequency domain; a decoding unit operable to recover data symbols from the frequency domain OFDM signal, which include clipping noise; a noise estimator operable to estimate the clipping noise in the frequency domain based on the data symbols; and a difference circuit operable to subtract the estimated clipping noise from the transformed OFDM signal.

In accordance with one or more further aspects of the present invention, an apparatus includes a processor operating under the control of one or more software programs that cause the processor to carry out actions, including: (a) transforming a received orthogonal frequency division multiplexed (OFDM) signal from a transmission channel into the frequency domain, the OFDM signal having been subject to a clipping function prior to transmission in order to reduce the peak-to-average power ratio (PAPR); (b) recovering data symbols from the transformed OFDM signal, which include clipping noise; (c) estimating the clipping noise in the frequency domain based on the data symbols; and (d) subtracting the estimated clipping noise from the transformed OFDM signal.

In accordance with one or more further aspects of the present invention, a storage medium contains one or more software programs that are operable to cause a processor executing the one or more software programs to carry out actions, including: (a) transforming a received orthogonal frequency division multiplexed (OFDM) signal from a transmission channel into the frequency domain, the OFDM signal having been subject to a clipping function prior to transmission in order to reduce the peak-to-average power ratio (PAPR); (b) recovering data symbols from the transformed OFDM signal, which include clipping noise; (c) estimating the clipping noise in the frequency domain based on the data symbols; and (d) subtracting the estimated clipping noise from the transformed OFDM signal.

In accordance with one or more further aspects of the present invention, the methods and apparatus for controlling cache memories described thus far and/or described later in this document, may be achieved utilizing suitable hardware, such as that shown in the drawings hereinbelow. Such hardware may be implemented utilizing any of the known technologies, such as standard digital circuitry, analog circuitry, any of the known processors that are operable to execute software and/or firmware programs, one or more programmable digital devices or systems, such as programmable read only memories (PROMs), programmable array logic devices (PALs), any combination of the above, etc.

Further, the methods of the present invention may be embodied in a software program that may be stored on any of the known or hereinafter developed media.

Other aspects, features and advantages of the present invention will become apparent to those skilled in the art when the description herein is taken in conjunction with the accompanying drawing.

BRIEF DESCRIPTION OF THE DRAWING

For the purposes of illustration, there are forms shown in the drawings that are presently preferred, it being understood, however, that the invention is not limited to the precise arrangements and instrumentalities shown.

DETAILED DESCRIPTION OF THE INVENTION

In general, the present invention is directed to methods and apparatus for iteratively estimate and cancel the distortion caused by clipping noise at the receiver. experimentation and simulation has shown that the methods and apparatus of the present invention may be applied to clipped and filtered OFDM signals such that (for an IEEE 802.11a system) the PAPR can be reduced to as low as 4 dB while the system performance can be restored to within 1 dB of the non-clipped case with only moderate complexity increase and with substantially no bandwidth expansion.

Figure 1:
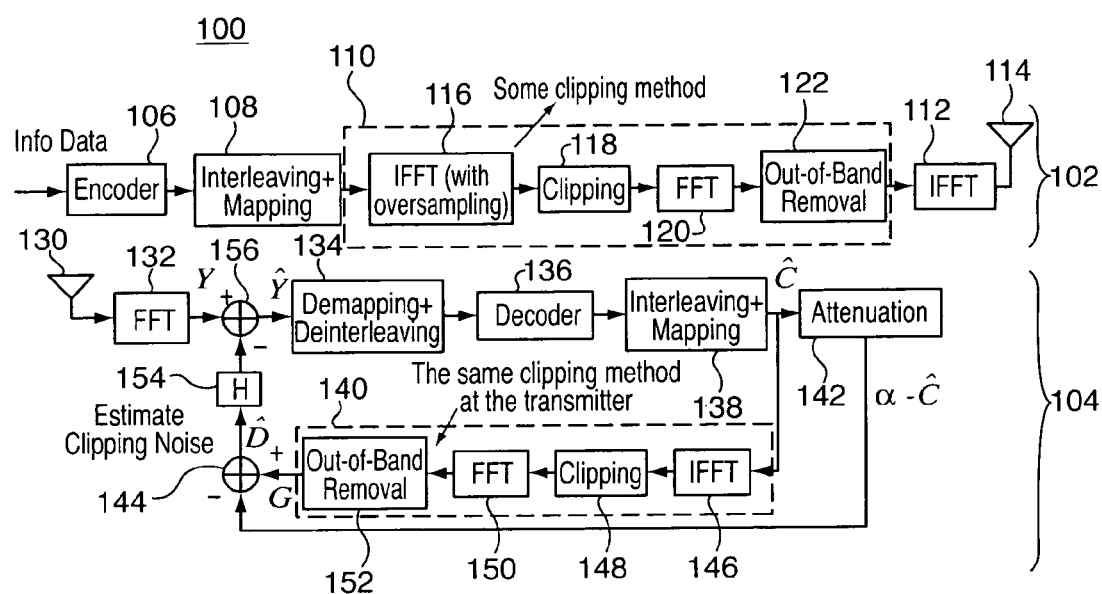
FIG. 1 is a block diagram illustrating a transmitter and a receiver incorporating a distortion cancellation feature in accordance with one or more aspects of the present invention.

In this regard, reference is now made to FIG. 1, which is a block diagram of a system 100 including a transmitter 102 and a receiver 104 incorporating one or more distortion cancellation features in accordance with one or more aspects of the present invention. It is understood that the system 100 is disclosed by way of block diagram to illustrate a logical partitioning of functional blocks, which may be considered as hardware elements, software routines, digital signal processing (DSP) routines, and/or straight method elements. It is also noted that the functional partitioning is provided by way of example only, it being understood that many variations of partitioning are contemplated without departing from the spirit and scope of the present invention.

The transmitter 102 preferably includes an encoder 106, an interleaving/mapping element 108, a clipping element 110, an inverse frequency domain transform element 112 (such as an inverse fast Fourier transform, IFFT), and an output stage 114 (which may include among other things an antenna). It is understood that the apparatus and/or process elements needed to achieve signal transmission over the air (or other transmission channel) preferably adhere to the requirements of the 802.11a standard (or protocol), e.g., with respect to operational frequency parameters, sub-carrier frequency parameters, power requirements, coding parameters, symbol definitions, bit rates, other protocol parameters, etc., which are all well known in the art.

The encoder 106 is operable to improve system performance (e.g., lower the error rate) by adding information data (redundancy) to the input data bits. For example, if the input data bits into the encoder 106 are grouped segments of two bits long (e.g., 00, 01, 10, 11), the encoder may output encoded data bits (or coded data bits) of four bits in length (e.g., 1011, etc.). This has an advantageous effect at the receiver (which as will be discussed below includes a corresponding decoder 136). The decoder 136 takes the received data signals for the four bits (e.g., 1011), which will be influenced by noise, and make a decision as to what two information bits correspond to the received four bits (plus noise). If the signal to noise ratio (SNR) is high enough, the decoder will output the proper two bits (e.g., 00). If the SNR is low, the decoder may output the wrong symbol in error. Any of the known (or hereinafter developed) encoders may be employed in connection with the present invention.

The interleaving/mapping element 108 may be two separate functional elements, one for interleaving and one for mapping, although for simplicity they are illustrated in integral fashion. As for the interleaving function, the coded data bits are interleaved (permutated) before being mapped to symbols. The major purpose for using interleaving is to combat the affects of multi-path fading channels. Any of the known (or hereinafter developed) interleaving techniques may be employed without departing from the spirit and scope of the present invention. For example, an IEEE standard 802.11a block interleaver may be suitable for used in connection with implementing the present invention. The 802.11a interleaver is defined by a two-step permutation. The first permutation ensures that adjacent coded bits are mapped onto nonadjacent sub-carriers. The second permutation ensures that adjacent coded bits are mapped alternately onto less and more significant bits of the constellation and, thereby, long runs of low reliability (LSB) bits are avoided.

The interleaved data bits are then mapped into multi-level phase signals. For example, the mapping may be in accordance with the M-QAM technique (quadrature amplitude modulation), such as 16-QAM, where bits 0000 are mapped to a complex signal point −3−3i; bits 1001 are mapped to −1+3i, etc. Alternatively, the mapping may be in accordance with the M-PSK technique (phase shift keying). Those skilled in the art will appreciate that there are other known mapping techniques, which for simplicity are not discussed in detail but are inherently within the purview of the present invention. The output of the mapping function are modulated symbols.

The clipping element 110 is operable to limit the PAPR of the OFDM signal before amplification and transmission. Preferably the clipping function is performed digitally. To reduce peak power re-growth and distortion, the time domain signal is preferably over-sampled by a factor greater than two and then the amplitude of the time domain signal samples are limited by a threshold A (i.e., they are clipped). Further details regarding the clipping element 110 will be discussed below.

Following clipping, each modulated signal is assigned to a sub-carrier via the IFFT element 112 and transmitted over the transmission channel (such as air).

In connection with the foregoing, a low-pass equivalent of an OFDM signal can be represented by the following equation:

$$s(t) = \frac{1}{\sqrt{N}} \sum_{k=0}^{N-1} C_k \exp(j2\pi k f_0 t) \quad 0 \le t \le T, \tag{1}$$

where N is the number of sub-carriers, $f_0$ is the sub-carrier spacing, T is the symbol duration, $C_k$ is the complex modulated symbol. In keeping with the IEEE standard 802.11a, the modulated symbols are obtained by mapping an encoded bit stream. An OFDM block consists of the sequence of symbols $\{C_k\}_{k=0}^{N-1}$.

The PAPR of the transmitted OFDM signal may be defined by the following equation:

$$PAPR = \frac{\max_{0 \le t \le T} |s(t)|^2}{P_{av}}, \tag{2}$$

where $P_{av}$ is the average power of the transmitted symbol and the maximum is sought over the symbol duration. Note that the PAPR of equation (2) is defined for the average power $P_{av}$ measured after clipping and filtering.

Figure 2A:
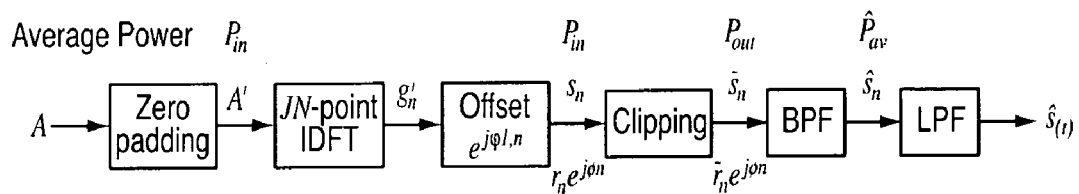
FIGS. 2a–2b are block diagrams illustrating a preferred approach to achieving a deliberately clipped OFDM signal, which may be employed in the transmitter and/or the receiver of FIG. 1 in accordance with one or more aspects of the present invention.
Figure 2B:
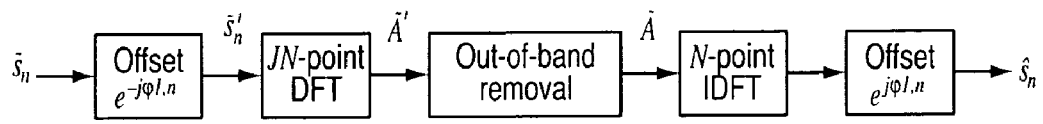

Although any of the known (or hereinafter developed) clipping techniques may be employed in connection with the present invention, it is preferred that a deliberate clipping approach as illustrated in FIGS. 2a–2b is used. It is noted at FIG. 2a illustrates a soft envelope limiter for an OFDM signal, while FIG. 2b illustrates further details of the band pass filter (BPF) of FIG. 2a. For simplicity, the details of FIGS. 2a–2b will not be described in detail herein as it is understood that one skilled in the art would know how to implement the clipping element illustrated. Further details concerning the clipping technique illustrated in FIGS. 2a–2b may be found in H. Ochiai and H. Imai, "Performance Analysis of Deliberately Clipped OFDM Signals," IEEE Transactions on Communications, Vol. 50, pp. 89–101 (January 2002), the entire disclosure of which is hereby incorporated by reference.

Referring again to the clipping element 110 of FIG. 1, such element includes an IFFT circuit 116, a clipping circuit 118, an FFT circuit 120 and an out of band removal circuit 122. In this regard, the IFFT circuit may operate to sample the OFDM signal of equation (1) at time intervals of $\Delta t = T/JN$, where J is the over-sampling factor. To reduce peak power regrowth and distortion, the time domain signal may be over-sampled by a factor greater than two. An over-sampled signal can be obtained by padding $\{C_k\}_{k=0}^{N-1}$ with (J−1)*N zeros and taking the inverse discrete Fourier transform (IDFT), or the inverse fast Fourier transform (IFFT). The discrete-time OFDM signal sampled at time instant $t = n\Delta t$ may then be expressed by the following equation:

$$s_n @ s(n\Delta t) \quad n = 0, \ldots, JN-1. \tag{3}$$

The clipping circuit 118 operates to limit the amplitude of the time domain signal samples via a threshold A. In this regard, let $\bar{s}_n$ be a clipped time sample with the phase left unchanged. Then, $$|\bar{s}_n| = \begin{cases} |s_n| & \text{if } |s_n| \le A \\ A & \text{if } |s_n| > A. \end{cases} \tag{4}$$

The clipped signal $\{\bar{s}_n\}_{n=0}^{JN-1}$ can be modeled as the aggregate of an attenuated signal component and clipping noise $\{d_n\}_{n=0}^{JN-1}$ $$\bar{s}_n = \alpha s_n + d_n \quad n=0, \ldots, JN-1, \qquad (5)$$

where the attenuation factor $\alpha$ is a function of the clipping ratio $\gamma$, defined as $\gamma = A/\sqrt{P_{in}}$, with $P_{in}$ the average signal power before clipping:

$$\alpha = 1 - e^{-\gamma^2} + \frac{\sqrt{\pi}\,\gamma}{2} erfc(\gamma). \qquad (6)$$

The FFT circuit 120 and the out of band removal circuit 122 operate to remove the out-of-band components resulting from clipping. The time domain samples of equation (5) are converted back to frequency domain via the FFT circuit 120 by applying the discrete Fourier transform (DFT) or the fast Fourier transform to the sequence $\{\bar{s}_n\}_{n=0}^{JN-1}$, to obtain the sequence $\{\bar{C}_k\}_{k=0}^{JN-1}$. Using equation (5), the terms $\bar{C}_k$ can be expressed by the following:

$$\bar{C}_k = \alpha C_k + D_k \quad k=0, \ldots, JN-1, \qquad (7)$$

where $\{C_k\}_{k=0}^{JN-1}$ and $\{D_k\}_{k=0}^{JN-1}$ are respectively, the DFT of $\{s_n\}_{n=0}^{JN-1}$ and $\{d_n\}_{n=0}^{JN-1}$ in equation (5). In particular, $\{D_k\}_{k=0}^{JN-1}$ is the sequence representing the clipping noise in the frequency domain. The out of band removal circuit operates to remove the out-of-band components by processing only the in-band-components $\{\bar{C}_k\}_{k=0}^{N-1}$ through the IFFT circuit 112 (which may be an N-point IDFT).

The resulting sequence is transmitted over the antenna 114.

In accordance with one or more aspects of the present invention, the clipping process is repeated at the receiver 104 using the detected symbols. Thereafter, the frequency domain clipping noise is estimated and canceled. The receiver 104 operates in an iterative fashion to achieve this result. The receiver 104 preferably includes an antenna 130, an FFT circuit 132, a de-mapping and de-interleaving circuit 134, a decoder 136, an interleaving and mapping circuit 138, a clipping element 140, an attenuation circuit 142, an adder 144, an H circuit 154, and another adder 156.

The FFT circuit 132 operates to convert the signals received from the antenna 130 into the frequency domain (for example using the discrete Fourier transform). The adder 156 operates to subtract an estimate of the clipping noise from the output of the FFT circuit 132 (which will be discussed later herein). Assuming perfect synchronization and following DFT, the signal at the receiver may be expressed as follows:

$$Y_k = H_k(\alpha C_k + D_k) + Z_k \quad k=0, \ldots, N-1, \qquad (8)$$

where $H_k$ is the complex channel gain of the k-th sub-carrier assumed to be perfectly known and $Z_k$ is AWGN.

Basically, the de-mapping and de-interleaving circuit 134 and the decoder circuit 136 operate to decode and detect the channel observations $\{Y_k\}_{k=0}^{N-1}$.

The de-mapping and de-interleaving circuit 134 performs two basic functions. First, the received signal over each sub-carrier is demodulated (de-mapped) into signals of several bits (i.e., the reverse of the modulation/mapping process performed in the transmitter 102). This sequence of demodulated signals is then de-interleaved (i.e., the reverse of the interleaving process performed in the transmitter 102). This results in the original order prior to the interleaving process carried out in the transmitter 102.

Next the signals are passed to the decoder circuit 136 to be decoded. Although any of the known decoders may be employed without departing from the spirit and scope of the invention, it is preferred that the decoder is complementary to the encoder 106 of the transmitter 102, which both adhere to the IEEE 802.11a standard. Using the example presented above with respect to the encoder 106 of the transmitter 102, the decoder 136 takes the received data signals for the four bits (e.g., 1011), which will be influenced by noise, and make a decision as to what two information bits correspond to the received four bits (plus noise). If the signal to noise ratio (SNR) is high enough, the decoder will output the proper two bits (e.g., 00). If the SNR is low, the decoder may output the wrong symbol in error.

The decisions of the transmitted sequence obtained by the decoder 136 may be denoted as $\{\hat{C}_k\}_{k=0}^{N-1}$. This sequence $\{\hat{C}_k\}_{k=0}^{N-1}$ is processed through the interleaving and mapping circuit 138, which may be (and preferably is) of substantially the same functionality as the interleaving and mapping element 108 of the transmitter 102. The resultant signal is then subject to two branches. One branch regenerates the attenuated frequency domain samples of the non-clipped signals $\{\alpha\hat{C}_k\}_{k=0}^{N-1}$. This is achieved by passing the signal from the interleaving and mapping circuit 138 through the attenuation circuit 142.

The other branch regenerates the clipped signals at the receiver by passing the $\{\hat{C}_k\}_{k=0}^{N-1}$ through the clipping element 140. Preferably the clipping element 140 is substantially similar to the clipping element 110 of the transmitter 102. Thus, the clipping element 140 preferably includes an IFFT circuit 146, a clipping circuit 148, an FFT circuit 150 and an out of band removal circuit 152, which operate as discussed above with respect to the transmitter 102. In this regard, one may denote the regenerated clipped samples as $\{G_k\}_{k=0}^{N-1}$. In a substantially similar was as discussed above with respect to equation (7), the clipped signals can be represented as the sum of an attenuated non-clipped signal $\alpha\hat{C}_k$ and the clipping noise $\hat{D}_k$, as follows:

$$G_k = \alpha\hat{C}_k + \hat{D}_k \quad k=0, \ldots, N-1. \qquad (9)$$

Since $G_k$ and $\hat{C}_k$ are observable and a can be computed from equation (6), the clipping noise $\hat{D}_k$ can be estimated as follows:

$$\hat{D}_k = G_k - \alpha\hat{C}_k \quad k=0, \ldots, N-1. \qquad (10)$$

The summing circuit 144 is operable to subtract the estimated clipping noise terms $\hat{D}_k$ from the current channel observation to obtain a refined channel observation for the next iteration, as follows:

$$\hat{Y}_k = Y_k - H_k\hat{D}_k \quad k=0, \ldots, N-1 = \alpha H_k C_k + H_k(D_k - \hat{D}_k) + Z_k, \qquad (11)$$

where $(D_k - \hat{D}_k)$ is the residual clipping noise and H is the transfer function of block 154. This block 154 multiplies the input signals $\{\hat{D}_k\}_{k=0}^{N-1}$, the estimated clipping noise over each sub-carrier, with the complex channel gains $\{H_k\}_{k=0}^{N-1}$, where N is the number of sub-carriers.

This process is repeated iteratively, where $\{Y_k\}_{k=0}^{N-1}$ is replaced with $\{\hat{Y}_k\}_{k=0}^{N-1}$. As the iterations proceed, the estimation of the clipping noise components $\{\hat{D}_k\}_{k=0}^{N-1}$ becomes more and more accurate and the receiver performance is improved.

The above discussion of FIG. 1 reveals that each iteration for clipping noise estimation and cancellation requires a single pair of IFFT/FFT operations and decoding. Experimentation has shown that only about two such iterations are required to achieve satisfactory cancellation, which implies that the proposed method and apparatus of the invention requires only a moderate increase of complexity at the receiver 104.

While the methods and apparatus of the present invention estimate and cancel the clipping noise, prior art alternative signal reconstruction approaches attempt to restore the clipped signal to its non-clipped form. These prior art techniques are more sensitive to decision errors. Indeed, using the notation developed and discussed above, the estimated difference between the frequency domain samples of the non-clipped and clipped signals may be defined as follows: $\Delta C_k = \tilde{C}_k - G_k$. Then, the reconstructed frequency domain samples may be expressed as follows:

$$\hat{Y}_k^{(R)} = Y_k + H_k \Delta C_k \quad k=0, \ldots, N-1. \tag{12}$$

Substituting $\Delta C_k = \hat{C}_k - G_k$ and $G_k$ from equation (9), and applying the first relation in equation (11), the following results:

$$\hat{Y}_k^{(R)} = Y_k - H_k \hat{D}_k + (1-\alpha) H_k \hat{C}_k = \hat{Y}_k + (1-\alpha) H_k \hat{C}_k \quad k=0, \ldots, N-1. \tag{13}$$

This evidences the differences between various aspects of the present invention and the prior art techniques. Indeed, $\hat{Y}_k^{(R)}$, the reconstructed observation with the signal restored to its non-clipped form, has an extra term $(1-\alpha) H_k \hat{C}_k$ compared to $\hat{Y}_k$, the corrected observation with the clipping noise removed. Note that $\hat{C}_k$ is the decision at the previous iteration and should not be directly passed to the next iteration as part of the refined channel observation. Hence, equation (12) contains an additional term, which will propagate decision errors. Only for large clipping ratios $\alpha \approx 1$, is this error term negligible.

Simulations have been conducted using the methods and apparatus described above with respect to FIG. 1. These simulations have been conducted for clipped and filtered OFDM signals over both AWGN and fading channels. The clipping approach used in the simulations was that illustrated in FIG. 2 with a clipping ratio set to $\gamma=1$ and the out-of-band radiation removed. The simulation model was designed to match IEEE Std. 802.11a. The convolutional encoders used in the simulation were the industry standard constraint length 7, rate 1/2 with generator polynomials $g_0 = 133_8$ and $g_1 = 171_8$. The number of sub-carriers was N=64, and the modulation was 16-QAM. Decoding was carried out using a soft Viterbi algorithm. The system performance is measured based on the packet error rate (PER), where each packet consists of 16 OFDM symbols. The $E_b/N_0$ is measured after signal clipping and filtering.

Figure 3:
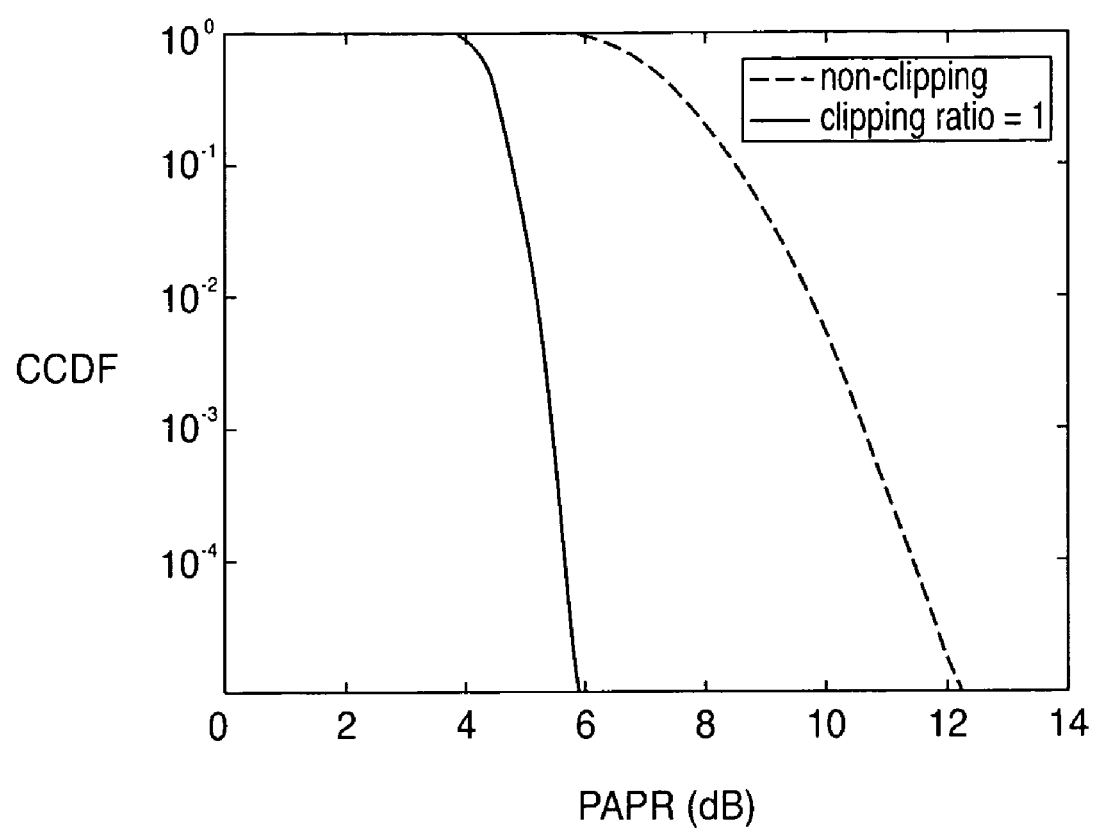
FIG. 3 is a graphical illustration of test results indicating the complementary cumulative density function (CCDF) versus the PAPR of a digitally clipped OFDM signal (with a clipping ratio of 1) in accordance with one or more aspects of the present invention.

With reference to FIG. 3, the complementary cumulative density function (CCDF) of the PAPR of digitally clipped OFDM signals with out-of-band radiation removed is illustrated. For a clipping ratio of $\gamma=1$, the PAPR is reduced from 12 dB to 6 dB.

Figure 4:
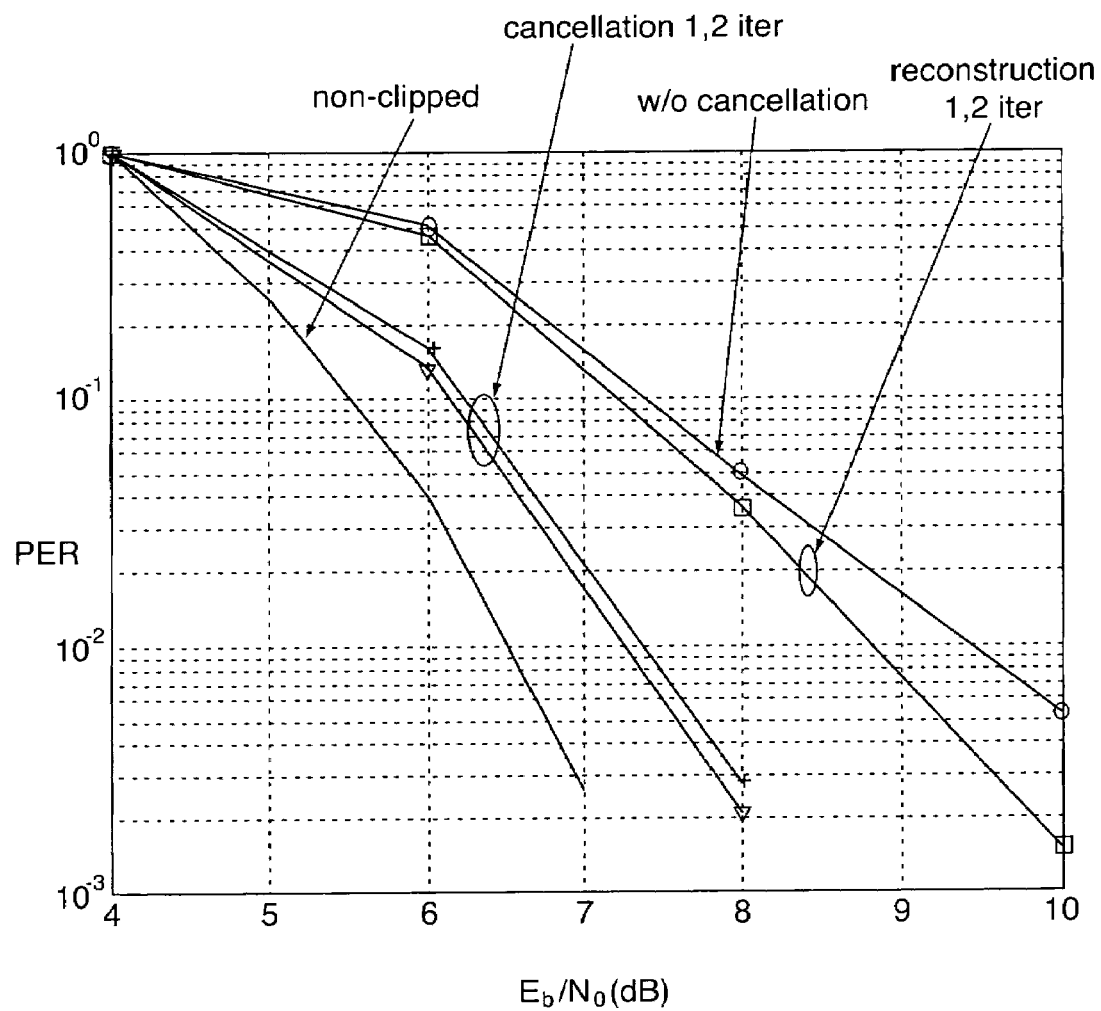
FIG. 4 is a graphical illustration of test results indicating the packet error rate (PER) versus ($E_b/N_0$) of the receiver of FIG. 1 over an AWGN channel including comparisons with the "signal reconstruction" approach.

With reference to FIG. 4, the simulated packet error rate (PER) performance of the receiver 104 over the AWGN channel is illustrated. The performance is compared with that of a receiver without clipping noise cancellation and to a receiver with signal reconstruction. For reference, the performance of a system without clipping is also provided. For the methods and apparatus of the present invention, a gain of about 2 dB relative to the case without cancellation is achieved after only one iteration at PER=0.01, and the system performance is restored to within 1 dB of the non-clipped case after two iterations. It is noted that the performance gain over the non-cancellation case increases as SNR increases. This is because at high SNR the AWGN noise becomes relatively small and the clipping noise begins to dominate. It is also noted that the performance of the signal reconstruction approach is worse by about 1.5 dB as compared with the methods and apparatus of the present invention.

Figure 5:
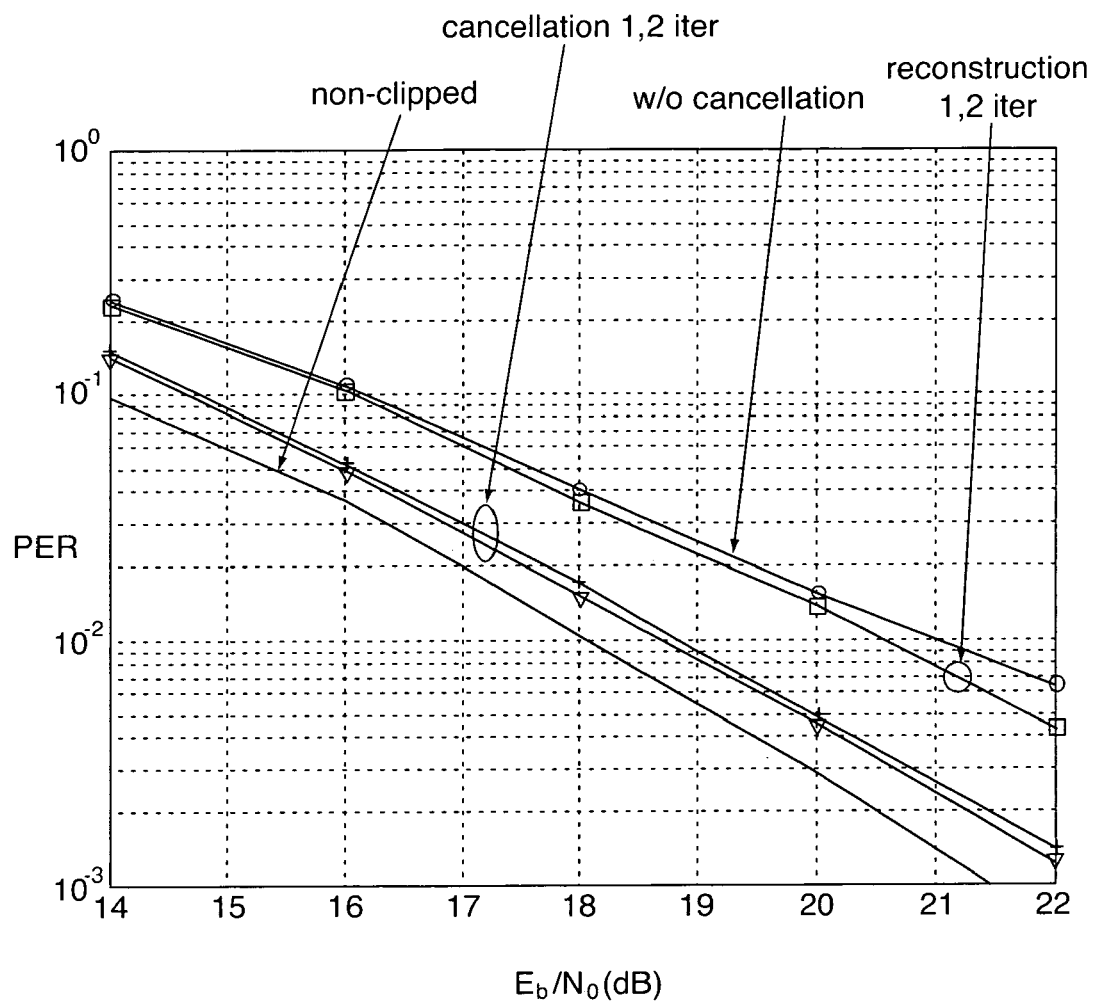
FIG. 5 is a graphical illustration of test results indicating the packet error rate (PER) versus ($E_b/N_0$) of the receiver of FIG. 1 (employing deliberate clipping) over a Rayleigh fading channel including comparisons with the "signal reconstruction" approach.

FIG. 5 illustrates the simulated PER performance of the receiver 104 over a Rayleigh fading channel with an exponentially decaying power delay profile, with normalized delay spread equal to 2. The channel is assumed to be constant over one packet and changes independently from packet to packet. It can be seen that after one iteration the performance of the clipped and filtered signals can be restored to within 1 dB of the non-clipping case. This represents a gain of about 2 dB at PER=0.01 as compared with the case without processing for the mitigation of clipping effects. At PER=0.006, the gain becomes 2.8 dB. It is also noted that the performance of the signal reconstruction approach performs worse by about 2 dB as compared with the present invention.

The simulation results show that the clipping noise cancellation approach of the present invention can significantly restore the performance. Further, more than about two iterations yields diminishing benefit. The reason appears to be that there exist some OFDM symbols that are too badly damaged by clipping for the iterative process to converge. This performance gap may be further narrowed by combining the approach discussed above with bit or symbol interleaving methods. Since it is known at the transmitter 102 how the OFDM symbol is affected by clipping, the badly damaged symbols (according to some criterion) can be interleaved and re-clipped, which may result in less clipping noise.

In the simulations for the fading channel, it was assumed that the channel gain was perfectly known at the receiver 104. This is a reasonable assumption since, with IEEE 802.11a, the PAPR of the training symbols is designed to be only 3 dB and clipping is not required. It follows that clipping has no impact on channel estimation. Pilots may be inserted in the data symbols for phase tracking are distorted by clipping noise. In accordance with the present invention, however, the clipping noise is estimated and these pilots can be restored before being processed.

Figure 6:
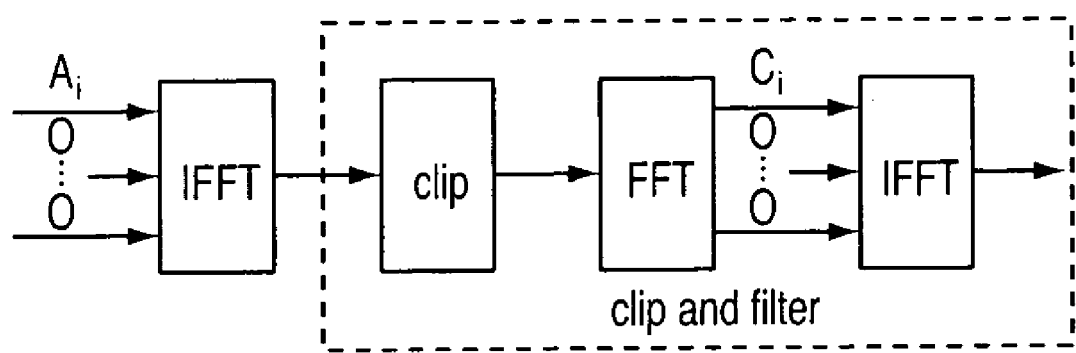
FIG. 6 is a block diagram illustrating a preferred approach to achieving a repeatedly clipped OFDM signal, which may be employed in the transmitter and/or the receiver of FIG. 1 in accordance with one or more aspects of the present invention.

With reference to FIG. 6, the clipping elements 110 and 140 may be implemented using the repeated clipping approach. The details of this clipping technique will not be discussed in great detail herein as they are well known to those skilled in the art. Further details on the repeated clipping technique may be found, however, in J. Armstrong, "Peak-to-Average Power Reduction for OFDM by Repeated Clipping and Frequency Domain Filtering," Electronics Letters, Vol. 38, pp. 246–247 (February 2002), the entire disclosure of which is hereby incorporated by reference.

The receiver 104 employing the repeated clipping technique has a similar structure as in FIG. 1, except that clipping and filtering are repeated to match the transmitter 102.

Using this technique, by repeating the digital clipping and filtering process with higher clipping ratio at each interval, the signals can be clipped to the same PAPR with less distortion. Without clipping noise cancellation, even with three or four times clipping and filtering the PAPR of the OFDM signal can be reduced only moderately (to 7 dB). Applying the repeated clipping approach to the transmitter 102 and the receiver 104, it may be shown that the PAPR of the 64-subcarrier OFDM signal can be reduced to 4 dB and the clipping noise cancellation approach of the present invention restores the system performance to within 1 dB of the non-clipping case.

Figure 7:
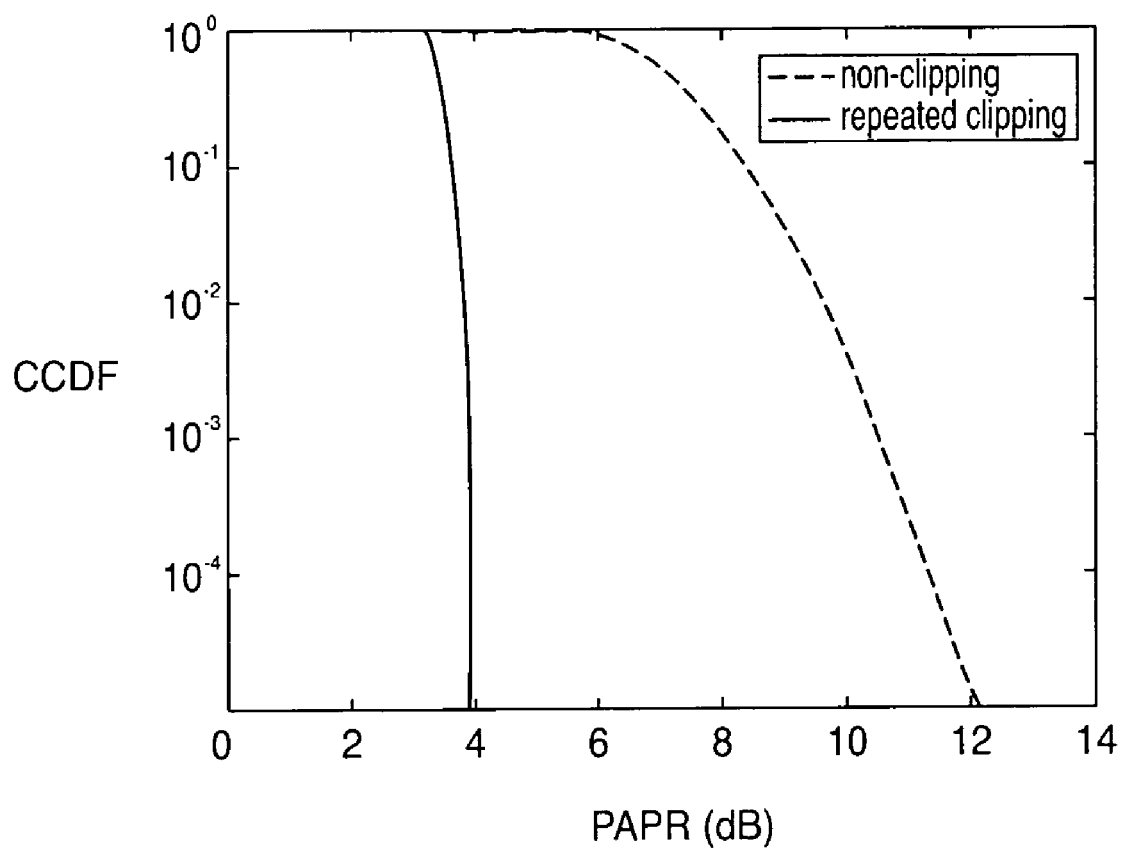
FIG. 7 is a graphical illustration of test results indicating the complementary cumulative density function (CCDF) versus the PAPR of a repeatedly clipped OFDM signal (with a clipping ratios of 1.5, 1.3, and 1.35) in accordance with one or more aspects of the present invention.

This approach has also been the subject of simulation. In particular, the clipping and filtering at the transmitter 102 are repeated three times, with clipping ratios set to 1.5, 1.3 and 1.35 respectively. FIG. 7 shows the PAPR distribution (CCDF) of the 64-subcarrier OFDM signals with this set of clipping ratios. It is noted that the PAPR is reduced to 4 dB, an 8 dB reduction compared to the non-clipped case. The clipping ratios used in the simulation has been chosen empirically.

Figure 8:
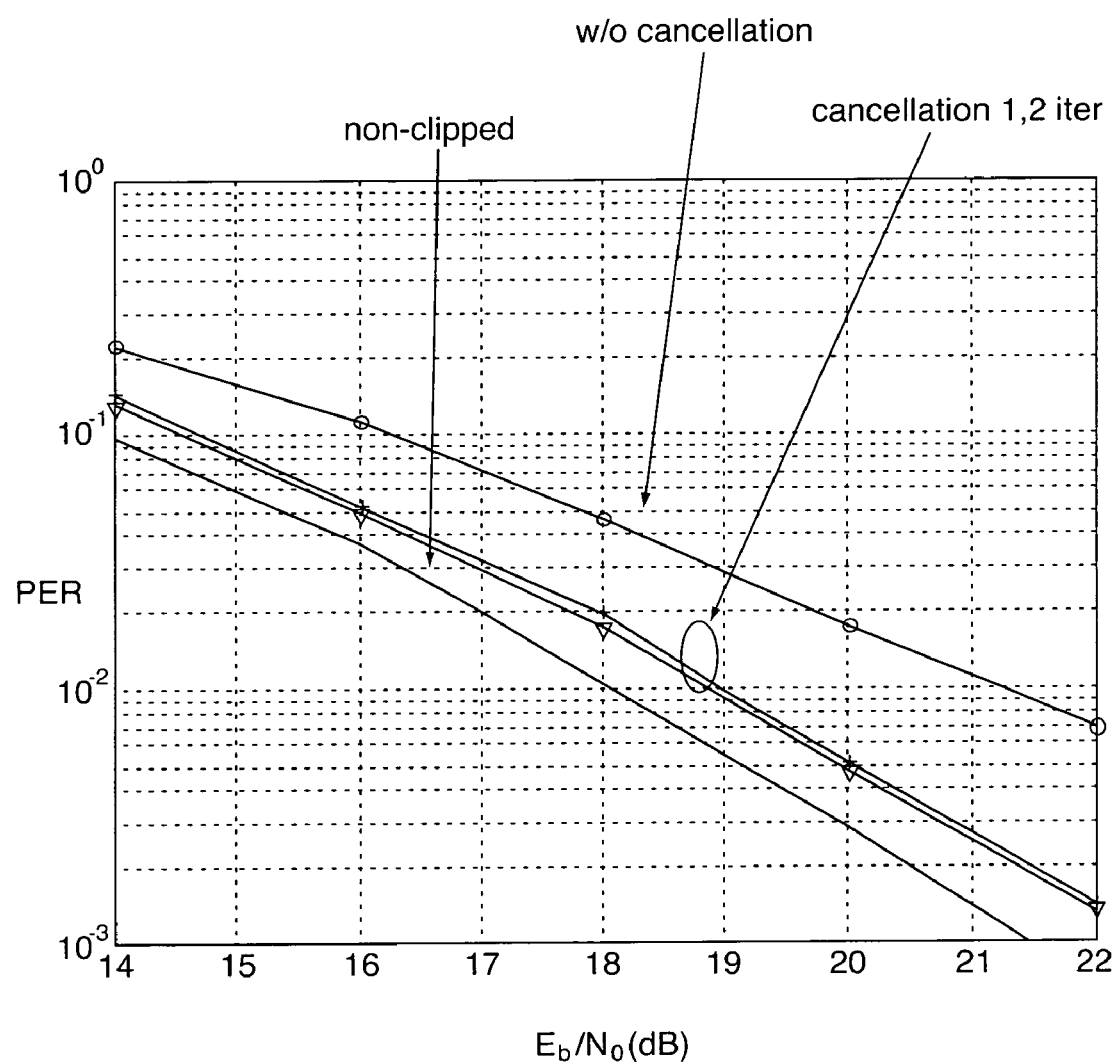
FIG. 8 is a graphical illustration of test results indicating the packet error rate (PER) versus ($E_b/N_0$) of the receiver of FIG. 1 (employing repeated clipping) over a Rayleigh fading channel including comparisons with the "signal reconstruction" approach.

FIG. 8 shows the PER performance of the system with repeated clipping. The channel model is the same Rayleigh fading channel as described hereinabove. It is noted that the receiver 104 restores the system performance to within 1 dB of the non-clipped case after two iterations. This represents an improvement of about 2.5 dB at PER=0.01.

Advantageously, various aspects of the present invention permit iterative distortion cancellation for clipped and filtered OFDM signals. The performance of a clipped and filtered OFDM system can be significantly improved with only moderate complexity increase at the receiver 104. In particular, the PAPR of the transmitted signal can be significantly reduced with acceptable performance loss. The receiver 104 is particularly suitable for IEEE 802.11a wireless LAN systems since it allows signals to be significantly clipped with only slight performance degradation.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method, comprising:
   (a) transforming a received orthogonal frequency division multiplexed (OFDM) signal from a transmission channel into the frequency domain, the OFDM signal having been subject to a clipping function prior to transmission in order to reduce the peak-to-average power ratio (PAPR);
   (b) recovering data symbols from the transformed OFDM signal, which include clipping noise;
   (c) subjecting the data symbols to substantially the same clipping function to which the OFDM signal had been subject to prior to transmission to produce clipped data symbols;
   (d) attenuating the data symbols;
   (e) subtracting the attenuated data symbols from the clipped data symbols to estimate the clipping noise in the frequency domain based on the data symbols; and
   (f) subtracting the estimated clipping noise from the transformed OFDM signal.

2. The method of claim 1, further comprising repeating steps (a) through (d) more than one time in order to iteratively cancel the clipping noise.

3. The method of claim 2, wherein steps (a) through (d) are repeated only two times.

4. The method of claim 2, wherein steps (a) through (d) are repeated only three times.

5. The method of claim 1, wherein the step of recovering data symbols in the frequency domain from the OFDM signal includes de-mapping the transformed OFDM signal, de-interleaving the de-mapped signal, decoding the de-interleaved signal, interleaving the decoded signal, and mapping the interleaved signal to obtain the data symbols.

6. The method of claim 1, further comprising: multiplying the estimated clipping noise over each sub-carrier with complex channel gains, prior to subtracting the estimated clipping noise from the transformed OFDM signal.

7. The method of claim 1, wherein the clipping function is one of a deliberate clipping algorithm and a repeated clipping algorithm.

8. An apparatus, comprising:
   a receiver operable to receive an orthogonal frequency division multiplexed (OFDM) signal from a transmission channel, the OFDM signal having been subject to a clipping function prior to transmission in order to reduce the peak-to-average power ratio (PAPR);
   a frequency transform unit operable to transform the OFDM signal to the frequency domain;
   a decoding unit operable to recover data symbols from the frequency domain OFDM signal, which include clipping noise;
   a noise estimator operable to estimate the clipping noise in the frequency domain based on the data symbols to produce clipped data symbols;
   an attenuator circuit operable to attenuate the data symbols;
   a first difference circuit operable to subtract the attenuated data symbols from the clipped data symbols to estimate the clipping noise in the frequency domain based on the data symbols; and
   a second difference circuit operable to subtract the estimated clipping noise from the transformed OFDM signal.

9. The apparatus of claim 8, wherein the receiver, the decoding unit, the noise estimator and the difference circuit operate iteratively in order to cancel the clipping noise.

10. The apparatus of claim 9, wherein only two iterative sequences are performed.

11. The apparatus of claim 9, wherein only three iterative sequences are performed.

12. The apparatus of claim 8, further comprising: means for de-mapping the transformed OFDM signal; means for de-interleaving the de-mapped signal; means for decoding the de-interleaved signal; means for interleaving the decoded signal; and means for mapping the interleaved signal to obtain the data symbols.

13. The apparatus of claim 8, further comprising a processing circuit operable to multiply the estimated clipping noise over each sub-carrier with complex channel gains, prior to subtracting the estimated clipping noise from the transformed OFDM signal.

14. The apparatus of claim 8, wherein the clipping function is one of a deliberate clipping algorithm and a repeated clipping algorithm.

15. An apparatus including a processor operating under the control of one or more software programs that cause the processor to carry out actions, comprising:
   (a) transforming a received orthogonal frequency division multiplexed (OFDM) signal from a transmission channel into the frequency domain, the OFDM signal having been subject to a clipping function prior to transmission in order to reduce the peak-to-average power ratio (PAPR);
   (b) recovering data symbols from the transformed OFDM signal, which include clipping noise;

(c) subjecting the data symbols to substantially the same clipping function to which the OFDM signal had been subject to prior to transmission to produce clipped data symbols;

(d) attenuating the data symbols;

(e) subtracting the attenuated data symbols from the clipped data symbols to estimate the clipping noise in the frequency domain based on the data symbols; and (f) subtracting the estimated clipping noise from the transformed OFDM signal.

16. The apparatus of claim 15, further comprising repeating steps (a) through (d) more than one time in order to iteratively cancel the clipping noise.

17. The apparatus of claim 16, wherein steps (a) through (d) are repeated only two times.

18. The apparatus of claim 16, wherein steps (a) through (d) are repeated only three times.

19. The apparatus of claim 15, wherein the step of recovering data symbols in the frequency domain from the OFDM signal includes de-mapping the transformed OFDM signal, de-interleaving the de-mapped signal, decoding the de-interleaved signal, interleaving the decoded signal, and mapping the interleaved signal to obtain the data symbols.

20. The apparatus of claim 15, further comprising: multiplying the estimated clipping noise over each sub-carrier with complex channel gains, prior to subtracting the estimated clipping noise from the transformed OFDM signal.

21. The apparatus of claim 15, wherein the clipping function is one of a deliberate clipping algorithm and a repeated clipping algorithm.

22. A storage medium containing one or more software programs that are operable to cause a processor executing the one or more software programs to carry out actions, comprising:

(a) transforming a received orthogonal frequency division multiplexed (OFDM) signal from a transmission channel into the frequency domain, the OFDM signal having been subject to a clipping function prior to transmission in order to reduce the peak-to-average power ratio (PAPR);

(b) recovering data symbols from the transformed OFDM signal, which include clipping noise;

(c) subjecting the data symbols to substantially the same clipping function to which the OFDM signal had been subject to prior to transmission to produce clipped data symbols;

(d) attenuating the data symbols;

(e) subtracting the attenuated data symbols from the clipped data symbols to estimate the clipping noise in the frequency domain based on the data symbols; and (f) subtracting the estimated clipping noise from the transformed OFDM signal.

23. The storage medium of claim 22, further comprising repeating steps (a) through (d) more than one time in order to iteratively cancel the clipping noise.

24. The storage medium of claim 23, wherein steps (a) through (d) are repeated only two times.

25. The storage medium of claim 23, wherein steps (a) through (d) are repeated only three times.

26. The storage medium of claim 22, wherein the step of recovering data symbols in the frequency domain from the OFDM signal includes de-mapping the transformed OFDM signal, de-interleaving the de-mapped signal, decoding the de-interleaved signal, interleaving the decoded signal, and mapping the interleaved signal to obtain the data symbols.

27. The apparatus of claim 22, further comprising: multiplying the estimated clipping noise over each sub-carrier with complex channel gains, prior to subtracting the estimated clipping noise from the transformed OFDM signal.

28. The storage medium of claim 22, wherein the clipping function is one of a deliberate clipping algorithm and a repeated clipping algorithm.

* * * * *